US011306665B2

(12) United States Patent
Yamaguchi et al.

(10) Patent No.: US 11,306,665 B2
(45) Date of Patent: Apr. 19, 2022

(54) THROTTLE DEVICE

(71) Applicant: AISAN KOGYO KABUSHIKI KAISHA, Obu (JP)

(72) Inventors: Shinya Yamaguchi, Chiryu (JP); Toshihide Kokubu, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/266,702

(22) PCT Filed: Aug. 9, 2019

(86) PCT No.: PCT/JP2019/031642
§ 371 (c)(1),
(2) Date: Feb. 8, 2021

(87) PCT Pub. No.: WO2020/045060
PCT Pub. Date: Mar. 5, 2020

(65) Prior Publication Data
US 2021/0301738 A1  Sep. 30, 2021

(30) Foreign Application Priority Data

Aug. 30, 2018 (JP) .............................. JP2018-161271

(51) Int. Cl.
*F16K 1/22* (2006.01)
*F02D 9/10* (2006.01)
*F16K 1/36* (2006.01)
*F16K 31/04* (2006.01)

(52) U.S. Cl.
CPC .............. *F02D 9/10* (2013.01); *F02D 9/1065* (2013.01); *F16K 1/22* (2013.01); *F16K 1/36* (2013.01);
(Continued)

(58) Field of Classification Search
CPC .... F02D 9/1065; F16K 1/221; F16K 2200/30; F16K 2200/302
See application file for complete search history.

(56) References Cited

U.S. PATENT DOCUMENTS 6,912,994 B2 * 7/2005 Ozeki ................... F02D 9/1065
123/337
6,986,336 B2 * 1/2006 Tanimura .............. F02D 9/1065
123/343
(Continued)

FOREIGN PATENT DOCUMENTS

JP  H01195932 A  8/1989
JP  H05214968 A  8/1993
(Continued)

OTHER PUBLICATIONS

Japanese Office Action dated Jun. 17, 2021, for Japanese Application No. 2018-161271 (4 p.).
(Continued)

*Primary Examiner* — Kevin F Murphy
(74) *Attorney, Agent, or Firm* — Conley Rose, P.C.

(57) ABSTRACT

A throttle device includes a throttle body, a throttle valve, a throttle shaft, a throttle gear, and a coil spring. A cylindrical spring guide disposed in the coil spring is provided on the throttle body. A full-close stopper and a full-open stopper arranged at a prescribed interval in a circumferential direction are provided on the spring guide. A fully closed opening regulation lever includes a full-close abutment configured to abut against the full-close stopper and full-open abutment configured to abut against the full-open stopper.

5 Claims, 4 Drawing Sheets

(52) U.S. Cl.
CPC ........ *F16K 31/041* (2013.01); *F16K 2200/30* (2021.08); *F16K 2200/302* (2021.08)

(56) References Cited

U.S. PATENT DOCUMENTS

| | | | | |
|---|---|---|---|---|
| 8,448,627 | B2* | 5/2013 | Kondo | F02D 9/1065 |
| | | | | 123/399 |
| 8,746,210 | B2* | 6/2014 | Nicholas | F02D 9/1065 |
| | | | | 123/396 |
| 10,533,676 | B2 | 1/2020 | Kokubu et al. | |

FOREIGN PATENT DOCUMENTS

| | | | |
|---|---|---|---|
| JP | 2009108796 | A | 5/2009 |
| JP | 2009299673 | A | 12/2009 |
| JP | 2012225208 | A | 11/2012 |
| JP | 2018040288 | A | 3/2018 |

OTHER PUBLICATIONS

English Translation of Japanese Office Action dated Jun. 17, 2021, for Japanese Application No. 2018-161271 (4 p.).
PCT/JP2019/031642 International Preliminary Report on Patentability dated Mar. 4, 2021 (5 p.).
PCT/JP2019/031642 International Search Report and Written Opinion dated Oct. 8, 2019 (10 p.).
PCT/JP2019/031642 Article 34 Amendment dated Jun. 29, 2020 (6 p.).
Indian Office Action dated Jan. 24, 2022, for Indian Application No. 202117007806 (6 p.).

* cited by examiner

THROTTLE DEVICE

CROSS-REFERENCE TO RELATED APPLICATIONS

The present application is a 35 U.S.C. § 371 U.S. National Phase entry of, and claims to the benefit of, PCT Application No. PCT/JP2019/031642, filed Aug. 9, 2019, which claims priority to Japanese Patent Application No. 2018-161271, filed Aug. 30, 2018, each of which is incorporated herein by reference in its entirety for all purposes.

STATEMENT REGARDING FEDERALLY SPONSORED RESEARCH OR DEVELOPMENT

Not applicable.

BACKGROUND

The present disclosure generally relates to throttle devices.

One type of a throttle device includes a full-close stopper and a full-open stopper, which are provided on the inner circumferential side of a circumferential wall of a gear housing of a throttle body as, for example, shown in Japanese Laid-Open Patent Publication No. 2009-299673. In addition, a full-close abutment capable of abutting the full-close stopper and a full-open abutment capable of abutting the full-open stopper are provided on an outer circumferential portion of the throttle gear, which rotates integrally with the throttle shaft.

Another type of a throttle device includes a full-close stopper formed on the inner side of an outer circumference of a cylindrical spring guide provided on a throttle body. In addition, a fully closed opening regulation member having a full-close abutment capable of abutting the full-close stopper is provided on a throttle shaft.

SUMMARY

In one aspect of this disclosure, a throttle device includes a throttle body having an intake passage, a throttle valve configured to open and close the intake passage, a throttle shaft configured to rotate integrally with the throttle valve, a rotor configured to rotate integrally with the throttle shaft, and a coil spring interposed between the throttle body and the rotor. The throttle body has a spring guide, which has a cylindrical shape and is disposed in the coil spring. The spring guide has a full-close stopper and a full-open stopper, which are circumferentially arranged with a predetermined gap therebetween. The throttle shaft is provided with a fully closed opening regulation member, which includes a full-close abutment capable of abutting the full-close stopper. The throttle shaft is provided with a fully opened opening regulation member, which includes a full-open abutment capable of abutting the full-open stopper.

In accordance with the aspect, a fully closed opening control means, which comprises the full-close stopper and the fully closed opening regulation member, and a fully opened opening control means, which comprises the full-open stopper and the fully opened opening regulation member, are provided between the spring guide and the throttle shaft. Thus, both control means corresponding to the fully closed opening control means and the fully opened opening control means can be compact. Consequently, the throttle device can be downsized.

DETAILED DESCRIPTION

As previously described, Japanese Laid-Open Patent Publication No. 2009-299673 discloses a throttle device including a fully closed opening control means, which includes the full-close stopper and the full-close abutment, and a fully opened opening control means, which includes the full-open stopper and the full-open abutment, on the outer circumferential side of the throttle gear. This arrangement increases the size of the throttle device. Therefore, there has been a need for improved throttle devices.

On the other hand, as described above, Japanese Laid-Open Patent Publication No. 2018-40288 discloses a throttle device including a fully closed opening control means, which comprises the full-close stopper and the fully closed opening regulation member, between the spring guide and the throttle shaft. This can make the fully closed opening control means into a compact form. However, Japanese Laid-Open Patent Publication No. 2018-40288 does not disclose a fully opened opening control means. Therefore, there has been a need for improved throttle devices.

Figure 1:
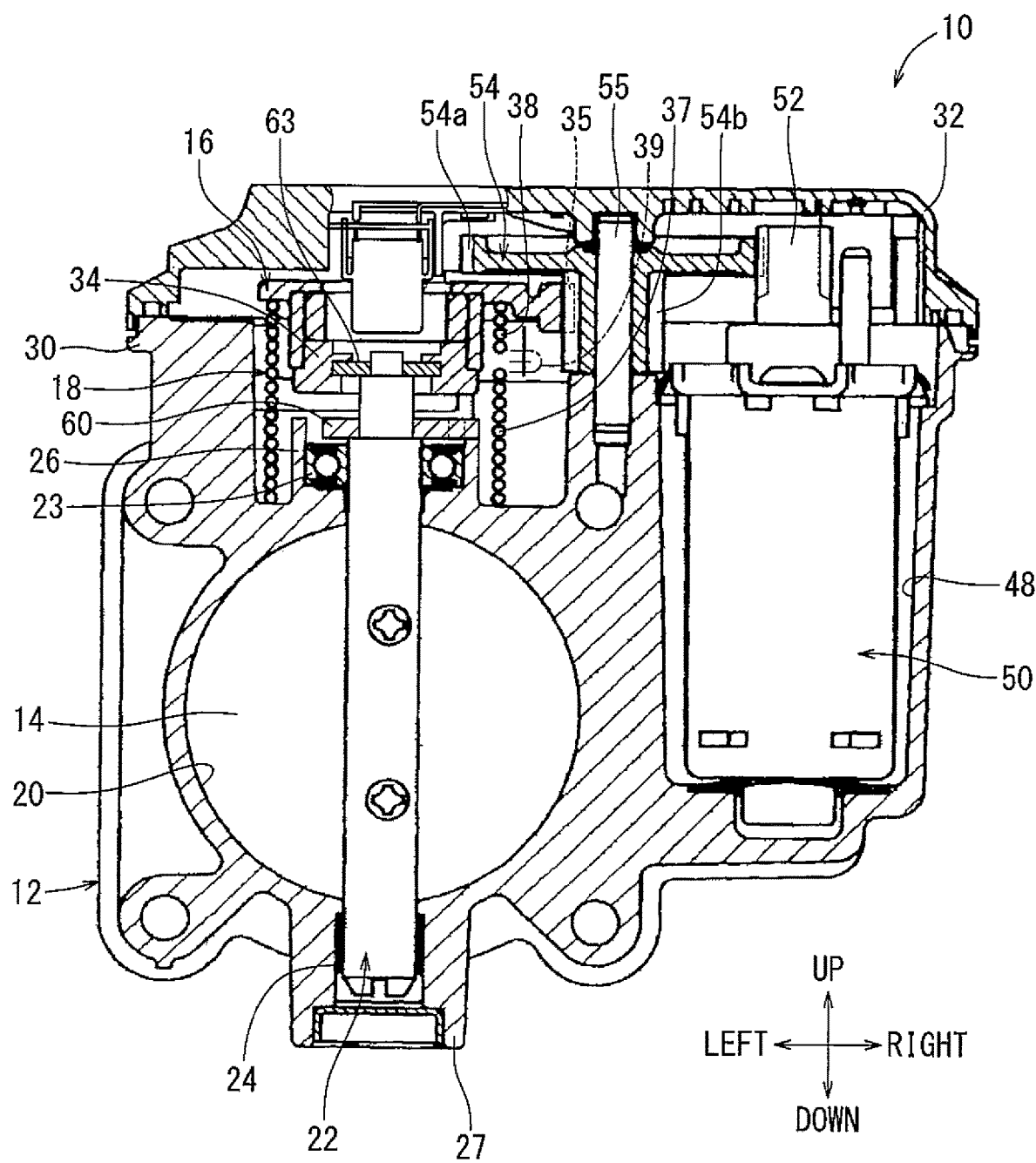
FIG. 1 is a cross-sectional view of an embodiment of a throttle device in accordance with the principles described herein.
Figure 2:
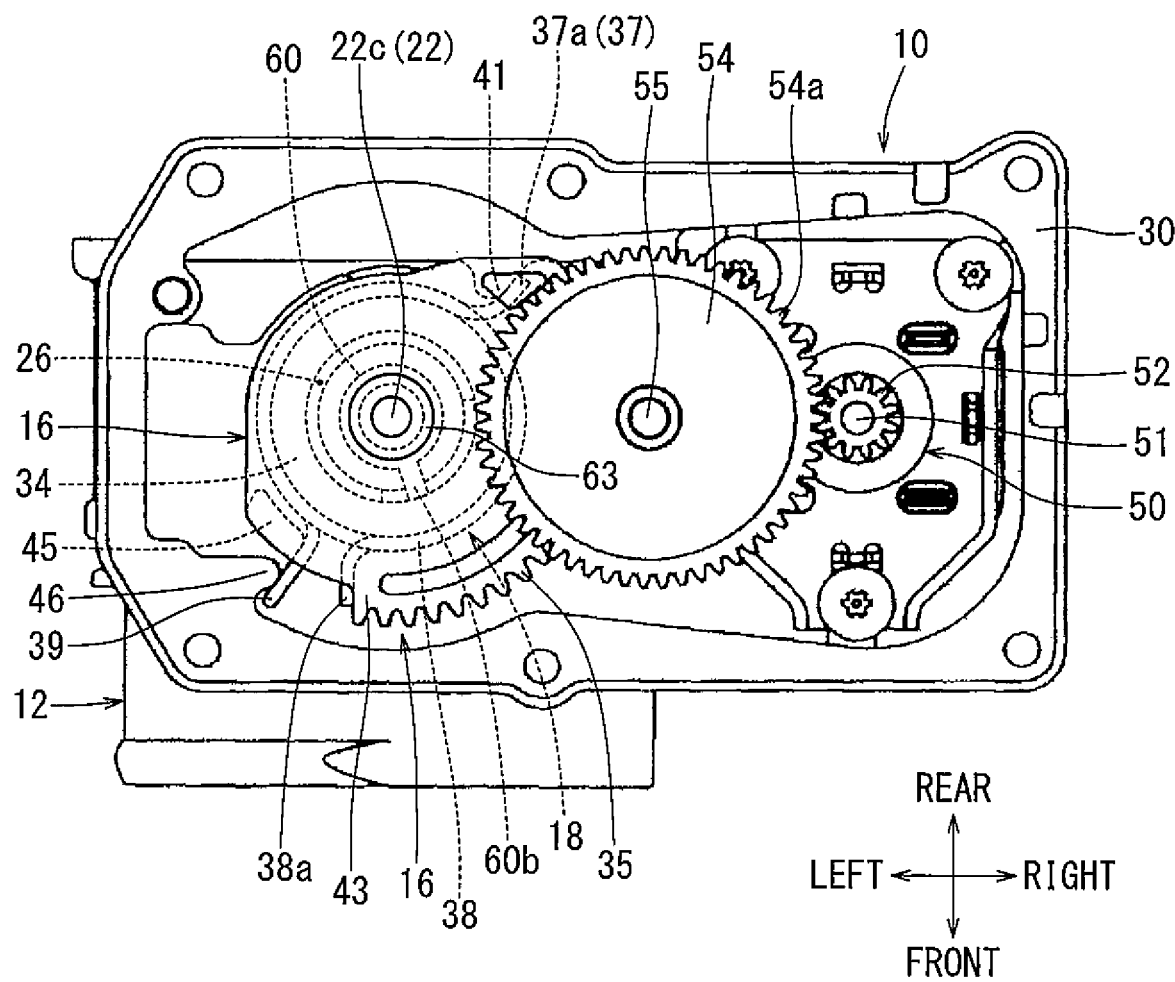
FIG. 2 is a plan view of the throttle device of FIG. 1 with the gear cover removed.

One embodiment of the present disclosure will be described below with reference to drawings. In particular, a throttle device 10 according to this embodiment is an electronic control throttle device that electronically controls the opening and closing of a throttle valve 14. FIG. 1 is a cross-sectional view of the throttle device 10. FIG. 2 is a plan view of the throttle device 10 with a gear cover 32 removed. For convenience of explanation, upward, downward, rightward, and leftward directions of the throttle device 10 are set on the basis of FIG. 1. However, these directions do not limit the possible installation orientations of the throttle device 10.

As shown in FIG. 1, the throttle device 10 includes a throttle body 12, the throttle valve 14, a throttle gear 16, and a coil spring 18. An intake passage 20 having a hollow cylindrical shape is formed in the throttle body 12. In particular, the intake passage 20 extends through the throttle body 12 in the front-rear direction, i.e. the direction perpendicular to both the up-down direction and the right-left direction. The throttle body 12 is installed in an air intake system of an internal combustion engine, also referred to herein as an engine. Although the throttle body 12 of the present embodiment is made of metal, it may alternatively be made of resin.

The throttle valve 14 is rotatably disposed in the intake passage 20 so as to open and close the intake passage 20 (i.e., to control fluid flow through the intake passage 20). The throttle valve 14 may be made of metal. In this embodiment, the throttle valve 14 has a circular plate shape. The throttle valve 14 is rotatably supported within the throttle body 12 by a throttle shaft 22. The throttle valve 14 is fixably attached to the throttle shaft 22. The throttle shaft 22 extends in the up-down direction such that the throttle shaft 22 traverses the intake passage 20 in a radial direction of the intake passage 20.

The throttle shaft 22 may be made of metal. The throttle shaft 22 is rotatably supported by the throttle body 12 via a pair of upper and lower bearings 23, 24. The bearings 23, 24 are disposed in boss parts 26, 27, respectively, formed in the throttle body 12. The throttle valve 14 is configured to rotate integrally with the throttle shaft 22, so as to open and close the intake passage 20, thereby controlling the quantity of intake air flowing through the intake passage 20 to the engine.

A gear housing part 30, which has a generally closed bottomed tube shape with an open top, is formed at an upward facing part of the throttle body 12. The gear cover 32 is attached to the top of the throttle body 12 so as to close the open top of the gear housing part 30. An upper end of the throttle shaft 22 extends vertically into the gear housing part 30.

In this embodiment, the throttle gear 16 is made of resin. The throttle gear 16 is attached to the upper end of the throttle shaft 22. The throttle gear 16 includes a boss part 34 coaxially aligned with the throttle shaft 22. The boss part 34 has a hollow cylindrical shape extending downward. As shown in FIG. 2, a gear part 35 extends circumferentially about an outer circumference of the throttle gear 16. The throttle gear 16 may also be referred to herein as a "rotor" herein.

As illustrated in FIG. 1, the coil spring 18 is interposed between the throttle body 12 and the throttle gear 16. The coil spring 18 includes a return spring part 37 wound in one direction, an opener spring part 38 wound in the other direction, and an intermediate hook part 39 that is folded to change the winding direction of the coil spring 18 between the spring parts 37, 38. The hook part 39 protrudes radially outward from the coil spring 18. The spring parts 37, 38 are shaped to have the same coil diameter as each other in a free, relaxed state.

The return spring part 37 is disposed around the upper boss part 26 of the throttle body 12 with a predetermined radial gap therebetween. The upper boss part 26 is formed in a hollow cylindrical shape and functions as a spring guide. Thus, the upper boss part 26 may also be referred to as a spring guide 26 herein. The opener spring part 38 is disposed around the boss part 34 of the throttle gear 16 with a predetermined radial gap therebetween. The boss part 34 has the same outer diameter as the outer diameter of the spring guide 26 and functions as a spring guide.

As shown in FIG. 2, a tip end part 37a of the return spring part 37 protrudes radially outward. The tip end part 37a is locked at and connected to a locking projection 41 of the throttle body 12 in a state where the return spring 37 is twisted so as to decrease the coil diameter thereof. The locking projection 41 may also be referred to as a "body side locking part" herein.

A tip end part 38a of the opener spring part 38 projects radially outward. The tip end part 38a is locked at and connected to a spring receiving part 43 provided on the throttle gear 16 in a state where the opener spring part 38 is twisted so as to decrease the coil diameter thereof. The spring receiving part 43 may also be referred to as a "rotor side locking part" or a "gear side locking part" herein.

The coil inner diameters of the spring parts 37, 38 are greater than the outer diameter of the spring guide 26 and the outer diameter of the boss part 34, respectively, at all positions between the full-closed position and the full-open position. The intermediate hook part 39 is directly engaged with a hook stopper part 45 provided on the throttle gear 16. The intermediate hook part 39 is configured to abut the opener stopper 46 provided on the throttle body 12 and be spaced apart from the same in the opening direction.

As shown in FIG. 1, a motor housing recess 48 having a closed bottomed hollow cylindrical shape is formed at a right part of the throttle body 12. An upper end of the motor housing recess 48 opens to the gear housing part 30. A control motor 50, which may be an electric motor such as a DC motor, is housed in the motor housing recess 48. As shown in FIG. 2, an output shaft 51 of the control motor 50 extends vertically into the gear housing part 30. A driving gear 52 is attached to the output shaft 51 of the control motor 50.

As shown in FIG. 1, a counter gear 54 is disposed between the throttle gear 16 and the driving gear 52 in the gear housing part 30. The counter gear 54 is rotatably supported by a counter shaft 55 extending between the throttle body 12 and the gear cover 32. The counter gear 54 includes a large diameter gear part 54a and a small diameter gear part 54b. The large diameter gear part 54a meshes with the driving gear 52 of the control motor 50. The small diameter gear part 54b meshes with the gear part 35 of the throttle gear 16.

An electronic control unit (ECU) controls the control motor 50. The driving force of the control motor 50 is transmitted to the throttle gear 16 via the driving gear 52 and the counter gear 54. When the throttle gear 16 is rotated in the opening direction and the closing direction in response to the driving force of the control motor 50, the throttle valve 14 is rotated with the throttle shaft 22, so as to open and close the intake passage 20. When the control motor 50 is not supplied with electric power, the throttle gear 16 is held in a default state due to elasticity and biasing force of the spring parts 37, 38 of the coil spring 18. In the default state, the throttle valve 14 is in a position in which it is opened from the full-closed position by a predetermined amount.

Figure 3:
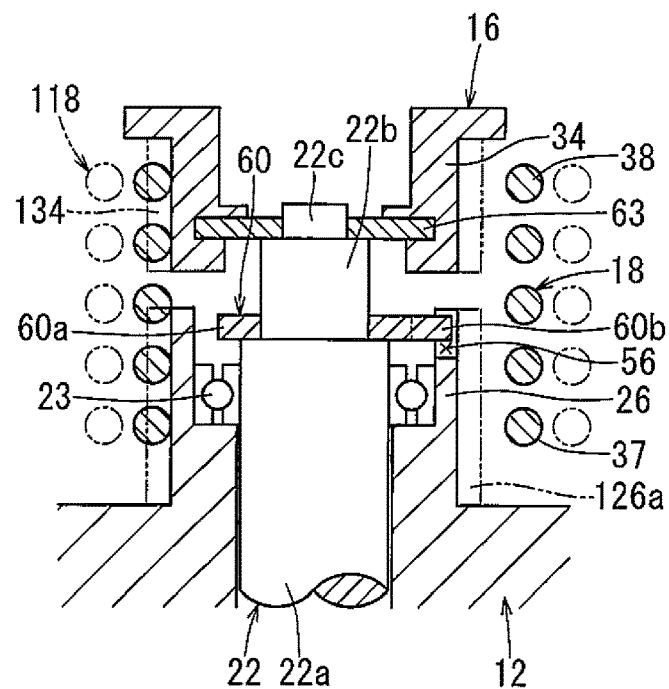
FIG. 3 is a schematic cross-sectional view of the opening regulation part of the throttle device of FIG. 1.
Figure 4:
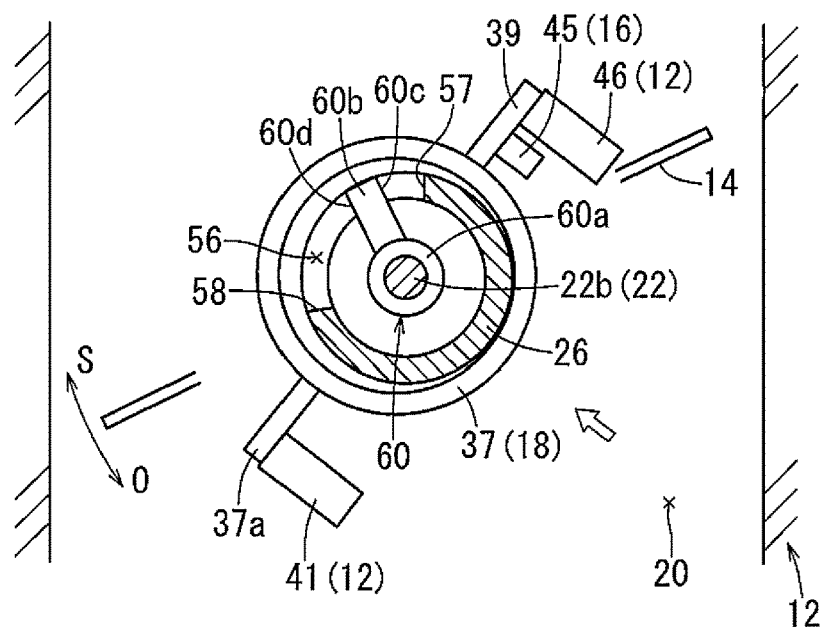
FIG. 4 is a schematic plan view of the opening regulation part of FIG. 3 in a default state.
Figure 5:
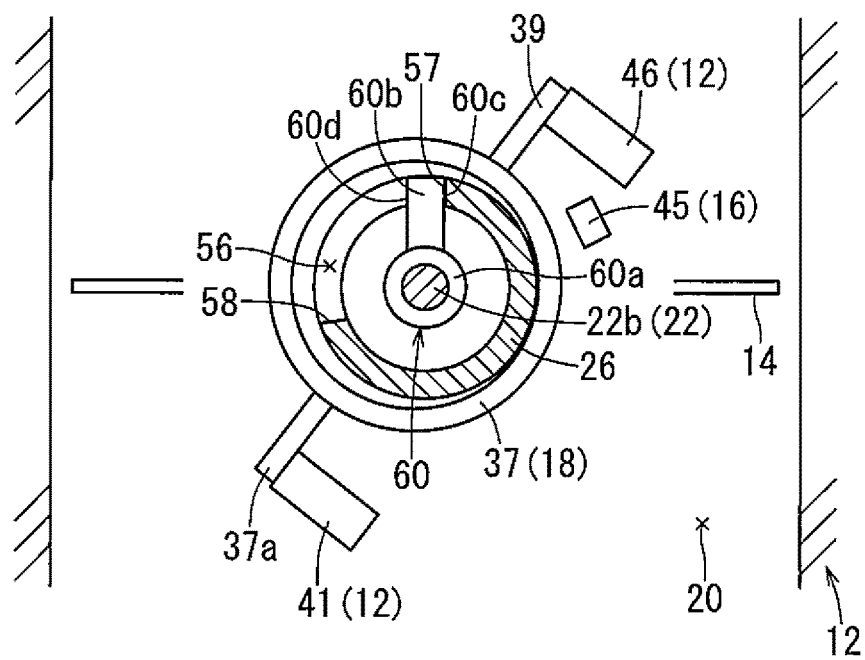
FIG. 5 is a schematic plan view of the opening regulation part of FIG. 3 in a fully closed state.
Figure 6:
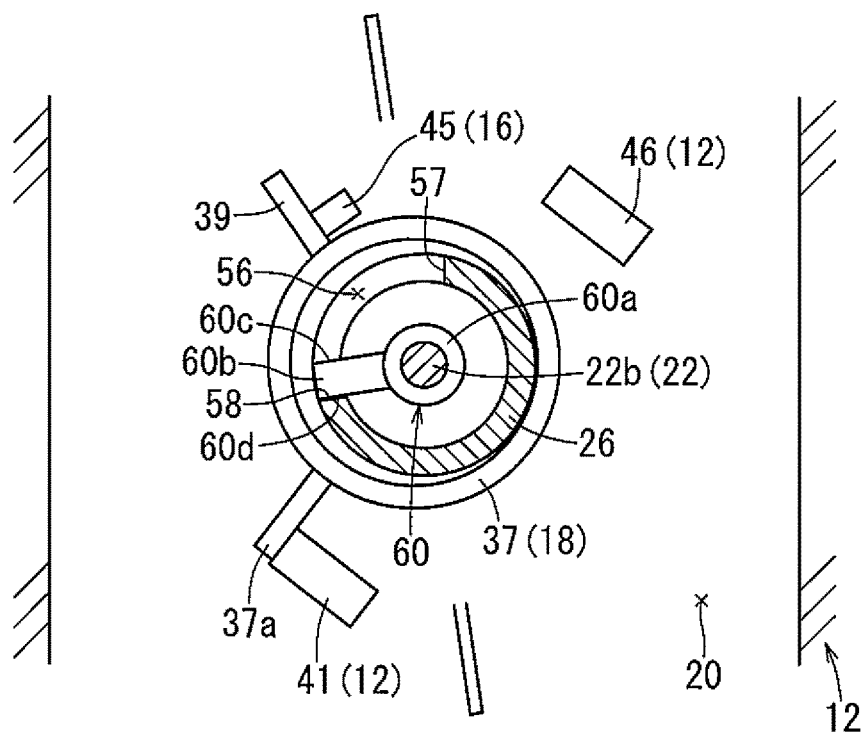
FIG. 6 is a schematic plan view of the opening regulation part of FIG. 3 in a fully opened state.

FIG. 3 is a cross-sectional view schematically illustrating an opening regulation part. FIG. 4 is a plan view schematically illustrating the opening regulation part in a default state. FIG. 5 is a plan view of the opening regulation part in a fully closed state. FIG. 6 is a plan view of the opening regulation part in a fully opened state. As shown in FIGS. 3 and 4, an open recess 56, which opens upwardly and radially, is formed at an upper end of the spring guide 26 of the throttle body 12. As shown in FIG. 4, the open recess 56 has a pair of flat facing parts, which circumferentially face each other with a predetermined circumferential gap therebetween. One of the facing parts of the open recess 56 (on the closing direction side) is referred to herein as a full-close stopper 57, and the other of the facing parts (on the opening direction side) is referred to as a full-open stopper 58.

The locking projection 41 and the opener stopper 46 of the throttle body 12 are symmetrically arranged with respect to the throttle shaft 22. Thus, the reaction force of the torsion torque of the return spring part 37 of the coil spring 18 acts in a direction perpendicular to or substantially perpendicular to the arrangement direction where the opener stopper 46 and the locking projection 41 are aligned (see a bold arrow in FIG. 4) on the side where the intermediate hook part 39 moves. As a result, one side part (a lower right portion in FIG. 4) of the return spring part 37 abuts the spring guide 26, and the other side part (an upper left portion in FIG. 4) is spaced apart from the spring guide 26. Accordingly, there is no problem if the other side part of the spring guide 26 does not serve as a spring guide supporting the coil spring 18, so that the open recess 56 is formed at the other side part of the spring guide 26. In other words, the open recess 56 is formed on the side opposite to the side where the return spring part 37 of the coil spring 18 abuts the spring guide 26 due to the reaction force of the torsion torque of the return spring part 37.

As shown in FIG. 3, a large diameter shaft part 22a, an intermediate diameter shaft part 22b, and small diameter shaft part 22c, which gradually decrease the outer diameter of the throttle shaft 22 moving in an upward direction, are coaxially aligned and formed at the upper end of the throttle shaft 22. The large diameter shaft part 22a corresponds to a shaft body of the throttle shaft 22. Each of the shaft parts 22a, 22b, 22c has a cylindrical shaft shape.

A fully closed opening regulation lever 60 is attached to the intermediate diameter shaft part 22b. The fully closed opening regulation lever 60 is made of metal. The fully closed opening regulation lever 60 includes an attachment plate part 60a having an annular plate shape and a lever part 60b having a strip plate shape extending radially outward from the attachment plate part 60a. The fully closed opening regulation lever 60 has a generally flat plate shape with the attachment plate part 60a and a full-close abutment 60c disposed on the same plane. The attachment plate part 60a may also be referred to as an "attachment part" herein.

The attachment plate part 60a is fitted onto the intermediate diameter shaft part 22b of the throttle shaft 22 with substantially no gap therebetween such that the attachment plate part 60a abuts an upper end surface of the large diameter shaft part 22a in a surface contact manner. As shown in FIG. 5, the attachment plate part 60a is fixed on the intermediate diameter shaft part 22b by welding, such as laser welding, at a position where the fully closed opening regulation lever 60 abuts the full-close stopper 57 in a state where the throttle valve 14 is in the full-closed opening position.

As shown in FIG. 4, a side edge of the lever part 60b, which circumferentially faces the full-close stopper 57, serves as the full-close abutment 60c. As shown in FIG. 5, when the full-close abutment 60c abuts the full-close stopper 57, the rotation of the throttle shaft 22 below the full-closed position is prevented. The full-closed position corresponds to an opening position where there is a slight gap (full-closed clearance) between the inner wall of the throttle body 12 defining the intake passage 20 and the throttle valve 14 for allowing the minimum degree of fluid communication through the intake passage 20. The fully closed opening regulation lever 60 may also be referred to as a "fully closed opening regulation member" herein.

A side edge of the lever part 60b, which circumferentially faces the full-open stopper 58, functions as a full-open abutment 60d. As shown in FIG. 6, when the full-open abutment 60d abuts the full-open stopper 58, the rotation of the throttle shaft 22 above the full-open position is prevented. The angle of the aperture of the open recess 56 is set on the basis of the rotational angle between the full-closed position and the full-open position. The fully closed opening regulation lever 60 also serves as a fully opened opening regulation member. Thus, the fully closed opening regulation lever 60 may also be referred to as the "fully opened opening regulation member" herein.

As shown in FIG. 3, an opener opening regulation ring 63 is coaxially disposed at the boss part 34 of the throttle gear 16. The opener opening regulation ring 63 is made of metal and has an annular plate shape. The opener opening regulation ring 63 is fitted on the small diameter shaft part 22c of the throttle shaft 22 with substantially no gap therebetween, such that the opener opening regulation ring 63 abuts an upper end surface of the intermediate diameter shaft part 22b in a surface contact manner. The opener opening regulation ring 63 is fixed on the small diameter shaft part 22c by welding, such as laser welding, at a position where the intermediate hook part 39 abuts both the hook stopper part 45 and the opener stopper 46 (see FIG. 4) in a state where the throttle valve 14 is in an opener opening position (a default position).

As shown in FIG. 4, when the throttle valve 14 is in the opener opening position (the default position), the biasing force of the return spring part 37 of the coil spring 18 in the closing direction (the direction shown by arrow S in FIG. 4) is balanced with the biasing force of the opener spring part 38 (see FIG. 1) in the opening direction (the direction shown by arrow O). In addition, the opener opening position (the default position) corresponds to a position where the throttle valve 14 is opened from the full-closed position (see FIG. 5) by the predetermined amount.

When the throttle gear 16 rotates from the default position in the closing direction, the hook stopper part 45 of the throttle gear 16 is spaced apart from the intermediate hook part 39. In the full-closed position (see FIG. 5), the full-close abutment 60c abuts the full-close stopper 57. When returning from the full-closed position in the opening direction, the hook stopper part 45 abuts the intermediate hook part 39 at the default position (see FIG. 4).

When the throttle gear 16 rotates from the default position in the opening direction, the intermediate hook part 39 is spaced apart from the opener stopper 46 while abutting the hook stopper part 45. In the full-open position (see FIG. 6), the full-open abutment 60d abuts the full-open stopper 58. When returning from the full-open position in the closing direction, the intermediate hook part 39 abuts the opener stopper 46 at the default position (see FIG. 4).

In accordance with the throttle device 10 of the present embodiment, the fully closed opening control means, which comprises the full-close stopper 57 and the fully closed opening regulation lever 60, and the fully opened opening control means, which comprises the full-open stopper 58 and the fully closed opening regulation lever 60, are provided between the spring guide 26 and the throttle shaft 22. Thus, both the control means (i.e., the fully closed opening control means and the fully opened opening control means) can be made in a compact form. Consequently, the throttle device 10 can be advantageously downsized.

The open recess 56 is formed on the spring guide 26 such that the open recess 56 opens in the radial direction and has a pair of the circumferential-spaced facing parts, which face each other with the predetermined circumferential gap therebetween, on the side opposite to the side where the coil spring 18 abuts the spring guide 26 due to the reaction force of the torsion torque of the coil spring 18. One of the facing parts of the open recess 56 serves as the full-close stopper 57, and the other of the facing parts serves as the full-open stopper 58. Thus, for example, it is not necessary to provide an outer circumferential part of the spring guide 26, which is required for a case where the full-close stopper is formed at the inner side of the outer circumferential part of the spring guide 26 (see Japanese Laid-Open Patent Publication No. 2009-299673). Accordingly, the outer diameter of the spring guide 26 can be decreased by eliminating a portion corresponding to the outer circumferential part of the spring guide 26.

A decrease in the diameter of the spring guide 26 will be described. As shown in FIG. 3, if an outer circumferential part 126a (see two-dot line in FIG. 3) is formed on the outer circumferential side of the spring guide 26 such that the outer circumferential part 126a covers the open recess 56 having the full-close stopper, the outer diameter of the spring guide 26 increases. As a result, the diameter of the boss part 34 of the throttle gear 16 is also increased to the diameter of a boss part 134 (see two-dot line in FIG. 3). In addition, a coil spring 118 (see two-dot line in FIG. 3) having a larger coil diameter should be used. On the other hand, in accordance with the present embodiment, the outer diameter of the spring guide 26 can be decreased by eliminating the outer circumferential part 126a of the spring guide 26. As a result, the diameter of the boss part 134 of the throttle gear 16 can be decreased to the diameter of the boss part 34. In addition, the diameter of the coil spring 118 can be decreased to the diameter of the coil spring 18. Accordingly, the throttle device 10 can be downsized.

The fully closed opening regulation lever 60 includes the full-close abutment 60c and the attachment plate part 60a mounted on the throttle shaft 22 on the same plane. Thus, the shape of the fully closed opening regulation lever 60 can be simplified as a flat plate shape. This can eliminate folding or bending of the full-close abutment 60c, which is required for the fully closed opening regulation lever 60 of Japanese Laid-Open Patent Publication No. 2009-299673, thereby decreasing its production cost.

The fully closed opening regulation lever 60 also serves as the fully opened opening regulation member, so as to eliminate a special fully opened opening regulation member. Thus, the structure of the throttle device 10 can be simplified, thereby reducing the production cost.

The opener stopper 46 and the locking projection 41 are symmetrically arranged with respect to the throttle shaft 22. Thus, the return spring part 37 of the coil spring 18 can be precisely biased in the predetermined direction due to the reaction force of the torsion torque of the coil spring 18. Accordingly, the arrangement positions of the full-close stopper 57 and the full-open stopper 58, i.e. the forming position of the open recess 56 can be easily defined.

The present disclosure is not limited to the above-described embodiment and can be modified without departing from the gist of the disclosure. For example, a special fully opened opening regulation member can be provided in addition to the fully closed opening regulation lever 60.

The present disclosure discloses various aspects of the technology. A first aspect is a throttle device including a throttle body having an intake passage, a throttle valve configured to open and close the intake passage, a throttle shaft configured to rotate integrally with the throttle valve, a rotor configured to rotate integrally with the throttle shaft, and a coil spring interposed between the throttle body and the rotor. The throttle body has a spring guide, which has a cylindrical shape and is disposed in the coil spring. The spring guide includes a full-close stopper and a full-open stopper, which are circumferentially arranged with a predetermined gap therebetween. The throttle shaft is provided with a fully closed opening regulation member, which includes a full-close abutment capable of abutting the full-close stopper. The throttle shaft is provided with a fully opened opening regulation member, which includes a full-open abutment capable of abutting the full-open stopper.

In accordance with the first aspect, a fully closed opening control means, which comprises the full-close stopper and the fully closed opening regulation member, and a fully opened opening control means, which comprises the full-open stopper and the fully opened opening regulation member, are provided between the spring guide and the throttle shaft. Thus, both the control means corresponding to the fully closed opening control means and the fully opened opening control means can be made in a compact form. Consequently, the throttle device can be downsized.

A second aspect is the throttle device of the first aspect, wherein an open recess is formed at the spring guide, such that the open recess opens in a radial direction and includes a pair of facing parts circumferentially facing each other with a predetermined gap therebetween on a side opposite to a side where the coil spring abuts the spring guide due to a reaction force of a torsion torque thereof. One of the facing parts of the open recess serves as the full-close stopper, and the other of the facing parts serves as the full-open stopper.

In accordance with the second aspect, it is not necessary to provide an outer circumferential part of the spring guide in comparison with, e.g. a case where the full-close stopper is formed on the inner side of the outer circumferential part of the spring guide (see Japanese Laid-Open Patent Publication No. 2009-299673). Thus, the outer diameter of the spring guide can be decreased by eliminating a part corresponding to the outer circumferential part from the spring guide.

A third aspect is the throttle device of the first or second aspect, wherein the fully closed opening regulation member includes the full-close abutment and an attachment part to the throttle shaft on a single plane.

In accordance with the third aspect, the shape of the fully closed opening regulation member can be simplified as a flat plate shape. For example, this can omit the folding process of the full-close abutment, which is required for the fully closed opening regulation member of Japanese Laid-Open Patent Publication No. 2009-299673, thereby reducing the production cost.

A fourth aspect is the throttle device of any one of the first to third aspects, wherein the fully closed opening regulation member serves as the fully opened opening regulation member.

In accordance with the fourth aspect, a special fully opened opening regulation member can be omitted. Thus, the configuration of the throttle device can be simplified, thereby reducing the production cost.

A fifth aspect is the throttle device of any one of the first to fourth aspects, wherein the coil spring includes an intermediate hook part capable of abutting an opener stopper provided on the throttle body, a return spring part wound from the intermediate hook part in one direction, and an opener spring part wound from the intermediate hook part in the other direction. A tip end part of the return spring part is connected to a body side locking part provided on the throttle body. A tip end part of the opener spring part is connected to a rotor side locking part provided on the rotor. The opener stopper and the body side locking part are symmetrically arranged with respect to the throttle shaft.

In accordance with the fifth aspect, the return spring part of the coil spring can be precisely biased in the predetermined direction due to the reaction force of the torsion torque of the coil spring. Thus, the arrangement positions of the full-close stopper and the full-open stopper can be easily defined.

The invention claimed is:

1. A throttle device, comprising:
   a throttle body having an intake passage;
   a throttle valve attached to a throttle shaft configured to rotate the throttle valve to open and close the intake passage;
   a rotor coupled to the throttle shaft and configured to rotate with the throttle shaft; and a coil spring including a first end and a second end, the first end being connected to the throttle body, the second end being connected to the rotor, wherein:

the throttle body includes a spring guide having a cylindrical shape and being disposed within the coil spring;

the spring guide includes a full-close stopper and a full-open stopper that are circumferentially spaced apart by a predetermined gap therebetween;

the spring guide includes a first side and a second side opposite to the first side;

the full-close stopper and the full-open stopper are positioned on the first side of the spring guide;

the coil spring is configured to contact the spring guide on the second side of the spring guide in response to a reaction force of a torsion torque of the coil spring;

the throttle shaft includes a fully closed opening regulation member comprising a full-close abutment configured to abut the full-close stopper; and the throttle shaft includes a fully opened opening regulation member comprising a full-open abutment configured to abut the full-open stopper.

2. The throttle device of claim 1, wherein:
an open recess is formed on the spring guide, wherein the open recess opens in a radial direction and includes a pair of facing parts circumferentially facing each other with a predetermined circumferential gap therebetween on the first side of the spring guide; and one of the facing parts of the open recess defines the full-close stopper and the other of the facing parts defines the full-open stopper.

3. The throttle device as claimed in claim 1, wherein the fully closed opening regulation member includes the full-close abutment and an attachment part mounted to the throttle shaft on a single plane.

4. The throttle device as claimed in claim 1, wherein the fully closed opening regulation member defines the fully opened opening regulation member.

5. The throttle device as claimed in claim 1, wherein:
the coil spring includes an intermediate hook part configured to abut an opener stopper on the throttle body, a return spring part wound from the intermediate hook part in a first direction, and an opener spring part wound from the intermediate hook part in a second direction that is opposite to the first direction;

a tip end part of the return spring part is connected to a body side locking part on the throttle body;

a tip end part of the opener spring part is connected to a rotor side locking part on the rotor; and the opener stopper and the body side locking part are symmetrically arranged with respect to the throttle shaft.

* * * * *